United States Patent
Ley et al.

[15] 3,694,555
[45] Sept. 26, 1972

[54] 3-CARBOXYLIC ACID AMIDO-QUINOXALINE-1,4-DI-N-OXIDES AS ANTIBACTERIAL AGENTS AND PHARMACEUTICAL COMPOSITIONS COMPRISING SAID OXIDES

[72] Inventors: Kurt Ley; Ulrich Eholzer; Roland Nast, all of c/o Farbenfabriken Bayer AG, Leverkusen; Karl Georg Metzger; Dieter Fritsche, both of c/o Farbenfabriken Bayer AG, Wuppertal-Elberfeld, all of Germany

[22] Filed: Feb. 16, 1970

[21] Appl. No.: 889,773

Related U.S. Application Data

[62] Division of Ser. No. 764,613, Oct. 2, 1968, Pat. No. 3,558,624.

[30] Foreign Application Priority Data

Oct. 4, 1967 Germany..................F 53366

[52] U.S. Cl..................................................424/250
[51] Int. Cl................................................A61k 27/00
[58] Field of Search....................424/250; 260/250 R

[56] References Cited

UNITED STATES PATENTS

| | | |
|---|---|---|
| 3,157,654 | 11/1964 | Sasse et al. ................424/250 |
| 3,398,141 | 8/1968 | Haddadin et al. .........260/250 |

*Primary Examiner*—Jerome D. Goldberg
*Attorney*—Jacobs & Jacobs

[57] ABSTRACT

Pharmaceutical compositions are provided for controlling bacterial infections caused by gram-positive and gram-negative bacteria containing a 3-carboxylic acid amido-quinoxaline-1,4-di-N-oxide as active ingredient, as exemplified by 2-acetoxymethyl-3-carboxylic acid ethylamidoquinoxaline-di-N-oxide and its congeners. The dosage ranges from 5 mg/kg to 150 mg/kg daily orally or parenterally.

40 Claims, No Drawings

3-CARBOXYLIC ACID AMIDO-QUINOXALINE-1,4-DI-N-OXIDES AS ANTIBACTERIAL AGENTS AND PHARMACEUTICAL COMPOSITIONS COMPRISING SAID OXIDES

The present application is a divisional of our copending application Ser. No. 764,613, filed Oct. 2, 1968, now U.S. Pat. No. 3,558,624.

The present invention relates to new 3-carboxylic acid amido-quinoxaline-1,4-di-N-oxides which have chemotherapeutic properties, and to a process for their preparation. The 3-carboxylic acid amido-quinoxaline-1,4-di-N-oxides have the formula:

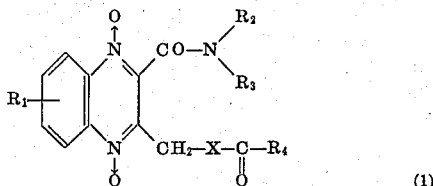

(1)

in which $R_1$ is hydrogen, lower alkyl, lower alkoxy or chlorine, $R_2$ is hydrogen or a straight or branched chain alkyl radical unsubstituted or substituted by hydroxy, lower alkoxy, acyloxy, mono- or di-alkylamino, $R_3$ is hydrogen or a straight or branched chain alkyl radical unsubstituted or substituted by hydroxy, lower alkoxy, acyloxy or mono- or di-alkylamino or, when $R_2$ is hydrogen, $R_3$ is cyclohexyl, or $R_2$ and $R_3$ together with the amide nitrogen atom form a five- or six-membered ring, $R_4$ is alkyl, halogen substituted alkyl, phenyl or hydroxy, methoxy or acetoxy substituted phenyl, and X is oxygen or sulphur.

These new compounds are produced by a process in which a 2-halomethyl-3-carboxylic acid amido-quinoxaline-1,4-di-N-oxide of the formula:

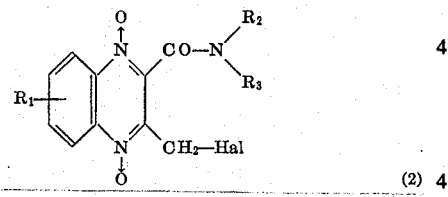

(2)

(in which Hal is chlorine or bromine) is reacted with a salt of a monocarboxylic acid of the formula:

(3)

(in which M is sodium, potassium or ammonium) in an organic solvent (optionally in the presence of water) in the temperature range of about 40° to about 160° C.

Surprisingly, the new compounds of the invention show an excellent chemotherapeutic effectiveness.

When $R_1$ is alkyl or alkoxy the alkyl generally contains one to four carbon atoms. When $R_2$ and $R_3$ are alkyl radicals they generally contain one to 12, preferably one to six, carbon atoms. The substituents (e.g. alkoxy or acyloxy) of the said alkyl radicals $R_2$ and $R_3$ have, in general, one to four carbon atoms in the alkyl group, the mono- and di-alkylamino groups likewise have, in general, one to four carbon atoms per alkyl group. In the case where $R_2$ and $R_3$ together with the N-atom form part of a heterocyclic ring, this ring may contain, besides the amide nitrogen, a further nitrogen or an oxygen heteroatom; in the case of the six-membered ring, the further heteroatom is preferably in p-position to the amide nitrogen atom, and the hydrogen atom may be substituted on the additional nitrogen atom by a lower alkyl ($C_1 - C_4$) radical which, in turn, may be further substituted by hydroxy, methoxy or acetoxy.

When 2-chloromethyl-3-carboxylic acid methylamidoquinoxaline-1,4-di-N-oxide and sodium benzoate are used as starting materials, the reaction course can be represented by the following formula scheme:

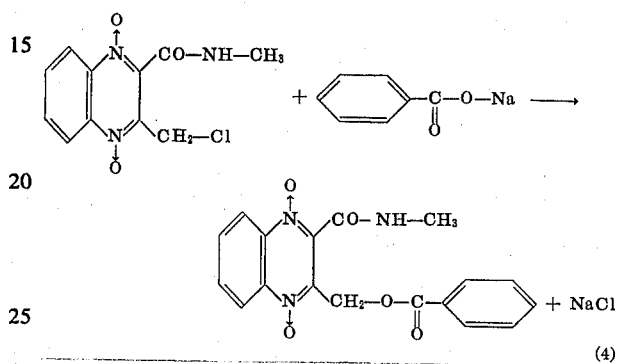

(4)

As examples of the 2-halomethyl-3-carboxylic acid amido-quinoxaline-1,4-di-N-oxides to be used according to the invention as starting compounds, there are mentioned in particular:

2-chloromethyl-3-carboxylic acid methylamidoquinoxaline-di-N-oxide-(1,4), 2-chloromethyl-3-carboxylic acid butylamido-quinoxaline-di-N-oxide-(1,4), 2-chloromethyl-3-carboxylic acid-β-methoxy-ethylamido-quinoxaline-di-N-oxide-(1,4), 2-chloromethyl-3-carboxylic acid dimethylamido-quinoxaline-di-N-oxide-(1,4), 2-chloromethyl-3-carboxylic acid-β-acetoxy-ethylamido-quinoxaline-di-N-oxide-(1,4), 2-chloromethyl-3-carboxylic acid cyclohexylamido-quinoxaline-di-N-oxide-(1,4), 2-bromomethyl-3-carboxylic acid pyrrolidylamido-quinoxaline-di-N-oxide-(1,4), 2-chloromethyl-3-carboxylic acid amido-quinoxaline-di-N-oxide-(1,4), 2-chloromethyl-3-carboxylic acid methylamido-7-methyl-quinoxaline-di-N-oxide-(1,4), 2-chloromethyl-3-carboxylic acid methylamido-7-methoxy-quinoxaline-di-N-oxide-(1,4), 2-chloromethyl-3-carboxylic acid methylamido-7-ethoxy-quinoxaline-di-N-oxide-(1,4), 2-chloromethyl-3-carboxylic acid methyl-amido-7-chloro-quinoxaline-di-N-oxide-(1,4), 2-chloromethyl-3-carboxylic acid piperidylamido-quinoxaline-di-N-oxide-(1,4).

As monocarboxylic acid salts used as reactants, there may be mentioned as examples: sodium acetate, potassium acetate, ammonium acetate, sodium benzoate, sodium salicylate, sodium chloroacetate, sodium o-methoxy-benzoate, sodium o-acetoxy methyl benzoate, sodium thioacetate.

1 to 2 moles of one of the said monocarboxylic acid salts in solid form or dissolved in water are used per mole of 2-halomethyl-3-carboxylic acid amido-quinoxaline-1,4-di-N-oxide.

As diluent, there may be used water-miscible organic solvents, lower alcohols, preferably ethanol, acetonitrile, dimethylformamide, dimethyl sulphoxide, dioxan.

A preferred embodiment of the process according to the invention comprises suspending or dissolving one mole of the 2-halomethyl-3-carboxylic acid-amido-quinoxaline-1,4-di-N-oxide in one of the organic solvents and adding one to two moles of the monocarboxylic acid salt in the form of its concentrated aqueous solution.

The reaction takes place in the temperature range of about 40° to about 160° C., preferably about 60° to about 100° C.

The 3-carboxylic acid amido-quinoxaline-1,4-di-N-oxides of the formula (1) are crystalline colorless or pale-yellow to flesh-colored substances. In general, they separate in crystalline form during cooling of the reaction mixture and can be isolated in customary manner, and if necessary, purified.

As already mentioned, the novel compounds of the invention show chemotherapeutic effectiveness. Their chemotherapeutic activity has been tested in animal experiments (orally and subcutaneously) in the case of acute bacterial infections and in vitro. They show in both cases very good antibacterial activity, the range of activity encompassing both gram-negative and gram-positive bacteria. The compounds can be administered both orally and parenterally.

In general, it has proved advantageous in the case of acute general infections to administer amounts of about 5 mg to about 150 mg, as a rule about 25 to about 150 mg, per kilogram of body weight per day in order to achieve effective results. Nevertheless, it may in some cases be necessary to deviate from the said amounts, depending on the infection mode or the nature of the bacteria, the body weight of the test animal or the route of application, but also because of the type of animal and its individual behavior towards the medicament or the kind of formulation thereof and the point in time or interval of time at which administration takes place. Thus, it may in some cases be sufficient to manage with less than the aforesaid minimum amount, whereas in other cases the said upper limit has to be exceeded. In the case of application of larger amounts, it may be advisable to distribute these in several individual doses during the day. For human medicine, the same dosage latitude is provided; even lower dosages may be suitable because of the different metabolic conditions.

The chemotherapeutical agent may be used either as such or in combination with pharmaceutically acceptable vehicles. Suitable as administration forms in combination with various inert vehicles are tablets, capsules, powders, sprays, aqueous suspensions, injectable solutions, elixirs, syrups and the like. Such vehicles include solid diluents or fillers, a sterile aqueous medium as well as various non-toxic organic solvents and the like. Tablets and the like suitable for oral administration may, of course, be provided with sweetening additives or the like. The therapeutically effective compound should in the aforesaid case be present in a concentration of about 0.5 to 90 percent by weight of the total mixture, i.e., in amounts which are sufficient to achieve the above-mentioned dosage margin.

In the case of oral application, tablets may of course also contain additives such as sodium citrate, calcium carbonate and dicalcium phosphate, together with various adjuvants such as starch, preferably potato starch, and the like, and binders such as polyvinylpyrrolidone, gelatin and the like. Furthermore, lubricants such as magnesium stearate, sodium lauryl sulphate and talc can also be used for tablet-making. In the case of aqueous suspensions and or elixirs which are intended for oral applications, the active compounds can be used with various taste improvers, dyestuffs, emulsifiers and/or together with diluents such as water, ethanol, propylene glycol, glycerol and similar such compounds or combinations.

For the case of parenteral application, solutions of the active compounds in sesame oil or arachis oil or in aqueous propylene glycol or N,N-dimethyl formamide can be used, as well as sterile aqueous solutions in the case of the water-soluble compounds. Such aqueous solutions should if necessary be buffered in customary manner and, furthermore, the liquid diluent should be rendered isotonic beforehand by addition of the requisite amount of salt or glucose. Such aqueous solutions are particularly suitable for intravenous, intramuscular and intraperitoneal injections.

The preparation of such sterile aqueous media takes place in known manner.

The effectiveness of some of the compounds described can be seen from the following summary; the number of the compounds tested correspond to the numbers of the examples added hereinafter. In the animal experiments with the white mouse, the intraperitoneally infected animals were treated subcutaneously or orally, as follows:

1. Administration in one dose, subcutaneously or orally, of 1,000 mg, 500 mg, 200 mg, 100 mg, 50 mg, 25 mg, 12.5 mg or 6.25 mg/kg 15 minutes before or 90 minutes after infection.

2. Administration in two (or three) doses of 6.25 mg, 12.5 mg, 25 mg, 50 mg, or 150 mg/kg 2 hours before and 5 hours after infection.

3. Administration in four doses of 50 mg or 150 mg/kg 2 hours before infection, shortly before infection, 3 hours, 5 hours and (or) 21 hours and 29 hours after infection.

As infection germs there were used *E. coli*, Klebsiella, *Staphylococcus aureus*, *Diplococcus pneumoniae* or *Streptococcus pyogenes*, *Proteus mirabilis* and *Pseudomonas aeruginosa*.

The $ED_{100}$ of the most effective compounds (e.g. 3, 4, 11, 16) against *E. coli* C 165 or *Staphylococcus aureus* 133 lies, in the case of administration in one dose, orally or subcutaneously, between 5 mg/kg and 100 mg/kg. The $DL_{50}$ lies in the dosage range of about 400 mg/kg to about 1,500 mg/kg after oral administration in one dose to mice. The substances are thus relatively non-toxic since the relatively less well tolerated ones are distinguished by higher effectiveness and are therefore applied only in low dosage. Also in the case of treatment of rats with 60 mg/kg orally twice daily over 2 weeks, the substances are well tolerated. In the case of acute ascending infections of the urinary tract of the rat (pyelonephritis), dosages of 2×15 mg/kg daily over 7–10 days were applied with success. In vitro, the substances act bacteriostatically and bactericidally. The new compounds are also effective against Mycoplasma infections in the in vitro test, amounts of about 5 to about 50 γ per ml being used.

1. Animal Experiments With the White Mouse

| Infection germ<br>100% Surviving Animals 24 hours after Infection | Example | | | | | | | |
|---|---|---|---|---|---|---|---|---|
| | 1 | 2 | 3 | 4 | 5 | 6 | 7 | 8 |
| E. coli C 165<br>Dose mg/kg oral and subcutaneous | 1×25 | 1×6 | 1×10 | 1×10 | 1×25 | 1×25 | 1×12 | 1×10 |
| Staph. aureus 133<br>Dose mg/kg oral and subcutaneous | 1×100 | 1×100 | 1×75 | 1×100 | 1×50 | 1×100 | 1×100 | 1×75 |

2. In vitro Inhibition Values
Minimum Inhibition Concentration in ug/ml Nutrient Medium

| Bact- | Example | | | | | | | | | | |
|---|---|---|---|---|---|---|---|---|---|---|---|
| | 2 | 3 | 1 | 5 | 6 | 7 | 8 | 11 | 12 | 13 | 14 | 16 |
| E. coli | 10-100 | 5 | 10 | 10-100 | 10-100 | 10-100 | 100 | 10-100 | 10-100 | 100 | >100 | 10-100 |
| Ps. aerug | 100 | 100 | 100 | >100 | >100 | >100 | >100 | >100 | >100 | 100 | >100 | >100 |
| Proteus sp. | 10 | 10 | 10 | 10 | 100 | 100 | 100 | 100 | 100 | 100 | >100 | 100 |
| Klebs. sp. | 5 | 5 | 10 | 10-100 | 10-100 | 100 | 100 | 10-100 | 10-100 | 100 | >100 | 10-100 |
| Staph. aureus | 10 | 10 | 10 | 10 | 100 | 100 | 100 | 100 | 100 | 100 | >100 | 10 |
| Streptoc. pyog. | 10 | 100 | 10 | 10 | >100 | 10 | 10 | 10 | 10 | 100 | 100 | 100 |

The invention is illustrated by the following non-limitative examples.

EXAMPLE 1

28.2 g (0.1 mole) of 2-chloromethyl-3-carboxylic acid ethylamido-quinoxaline-di-N-oxide-(1,4) are suspended in 100 ml of ethanol, a solution of 16 g (0.2 mole) of sodium acetate in 25 ml of water is added and heating to the boil is effected. After about 30 minutes a clear solution is obtained. Heating is continued for a further 30 minutes, followed by cooling. 20 g (=66 percent of the theory) of 2-acetoxymethyl-3-carboxylic acid ethylamido-quinoxaline-di-N-oxide-(1,4) separate as yellow crystals which, after washing with cold water and recrystallization from methanol, melt at 153° C.

Analysis: $C_{14}H_{15}N_3O_5$ (molecular weight 305)
Calc: C = 55.1%  H = 4.92%  N = 13.7%
Found: C = 55.4%  H = 5.1%  N = 14.1%

In manner analogous with that described in example 1, the compounds listed below can be obtained:

| Example No. | Formula | M.P. in °C. d=decomp. | Appearance |
|---|---|---|---|
| 2 | quinoxaline-di-N-oxide with -CO-NH₂ and -CH₂-O-CO-CH₃ substituents (5) | 224 | Pale-yellow crystals. |
| 3 | quinoxaline-di-N-oxide with -CO-NH-CH₃ and -CH₂-O-CO-CH₃ substituents (6) | 169 | Do. |
| 4 | quinoxaline-di-N-oxide with -CO-NH-C₂H₅ and -CH₂-O-CO-CH₃ substituents (7) | 153 | Do. |
| 5 | quinoxaline-di-N-oxide with -CO-NH-C₃H₇ and -CH₂-O-CO-CH₃ substituents (8) | 144 | Do. |
| 6 | quinoxaline-di-N-oxide with -CO-NH-CH(CH₃)₂ and -CH₂-O-CO-CH₃ substituents (9) | 156 | Do. |
| 7 | quinoxaline-di-N-oxide with -CO-NH-C₄H₉ and -CH₂-O-CO-CH₃ substituents (10) | 106 | Do. |

| Example No. | Formula | | M.P. in °C. d=decomp. | Appearance |
|---|---|---|---|---|
| 8 | [quinoxaline di-N-oxide with CO—NH—C(CH₃)₃ and CH₂—O—CO—CH₃] | (11) | 220 | Do. |
| 9 | [quinoxaline di-N-oxide with CO—NH—CH₂—CH₂—OCH₃ and CH₂—O—CO—CH₃] | (12) | 145 | Do. |
| 10 | [quinoxaline di-N-oxide with CO—NH—CH₂—CH₂—O—CO—CH₃ and CH₂—O—CO—CH₃] | (13) | 156 | Do. |
| 11 | [quinoxaline di-N-oxide with CO—N(CH₃)₂ and CH₂—O—CO—CH₃] | (14) | 213 | Do. |
| 12 | [quinoxaline di-N-oxide with CO—N(piperidine) H and CH₂—O—CO—CH₃] | (15) | 157 | Do. |
| 13 | [quinoxaline di-N-oxide with CO—NH—CH₃ and CH₂—S—CO—CH₃] | (16) | 204(d) | Do. |
| 14 | [quinoxaline di-N-oxide with CO—N(C₂H₅)₂ and CH₂—S—CO—CH₃] | (17) | 140 | Do. |
| 15 | [quinoxaline di-N-oxide with CO—NH₂ and CH₂—O—CO—C₆H₅] | (18) | 221 | Do. |
| 16 | [quinoxaline di-N-oxide with CO—NH—CH₃ and CH₂—O—CO—C₆H₅] | (19) | 204 | Do. |

| Example No. | Formula | M.P. in °C. d=decomp. | Appearance |
|---|---|---|---|
| 17 | ![structure] | (20) 132 | Do. |
| 18 | ![structure] | (21) 208 | Do. |

The 2-chloromethyl-3-carboxylic acid methylamido-quinoxaline-1,4-di-N-oxide used as starting material for the reaction according to the invention was obtained as follows:

A. 233 g (1 mole) 2-methyl-3-carboxylic acid methylamido-quinoxaline-di-N-oxide-(1,4) are suspended in 700 ml chloroform and heated to the boil. Into the boiling mixture there are introduced, within 3 hours, with stirring, 90 g (2.5 gram atoms) of chlorine. First the starting material dissolves, then the reaction product separates in crystalline form. Stirring is continued for 30 minutes at boiling temperature; air is then blown into the reaction mixture for 30 minutes in order to remove the HCl which is formed, and this is followed by cooling, and suction filtration. After recrystallization from ethanol/dioxan 181 g (=68 percent of the theory) of 2-chloromethyl-3-carboxylic acid methylamido-quinoxaline-1,4-di-N-oxide are obtained as yellow crystals which melt at 195°–196° C.

Analysis: $C_{11}H_{10}ClN_3O_3$ (Molecular weight 267.5)
Calc.: Cl: 13.3%
Found: Cl: 13.0%

B. The same substance was obtained by chlorination in glacial acetic acid at 85°–90° C. For working up, the reaction solution obtained is poured into water. A yellow oil separates, which crystallizes when rubbed with methanol. The substance shows no depression of melting point with that described under A.

In manner analogous with that described in the above example, the other 2-halomethyl-3-carboxylic acid amido-quinoxaline-di-N-oxides-(1,4) used for the reaction according to the invention can also be obtained.

The new 3-carboxylic acid amido-quinoxaline-1,4-di-N-oxides (X=0) may, if desired, also be obtained by oxidation of quinoxaline derivatives of the formula:

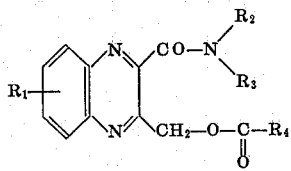

in which $R_1$, $R_2$, $R_3$ and $R_4$ have the meanings stated above with hydrogen peroxide in the presence of glacial acetic acid or acetic anhydride or an organic peracid (peracetic acid, perbenzoic acid, monoperphthalic acid) or mixture thereof and the like according to known methods (Houben-Weyl, Methoden der organischen Chemie, Vol. XI/2, p. 190; E. Ochiai, Aromatic Amine-oxides, Elsevier Publishing Company, 1967).

The invention also provides a pharmaceutical composition comprising one or more of the new active compounds in admixture with a solid or liquid diluent or carrier.

The invention further provides a medicament in dosage unit form comprising at least one of the new active compounds either alone or in admixture with a solid or liquid diluent or or carrier. The medicament may include a protective envelope containing the active compound and, if used, the diluent or carrier.

The term "medicament in dosage unit form" are used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:

1. A pharmaceutical composition for controlling bacterial infections comprising an antibacterially effective amount of a compound of the formula:

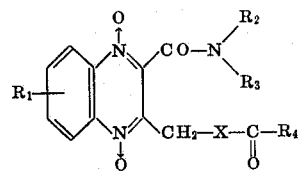

in which
$R_1$ is hydrogen, lower alkyl having one to four carbon atoms, lower alkoxy having one to four carbon atoms in the alkyl part, or chlorine,
$R_2$ is hydrogen or a straight or branched chain alkyl having one to 12 carbon atoms unsubstituted or substituted by hydroxy, lower alkoxy having one to four carbon atoms in the alkyl part, acyloxy having one to four carbon atoms in the alkyl part, mono- or di-alkylamino having one to four carbon atoms in the alkyl part,
$R_3$ is hydrogen or straight or branched chain alkyl having one to 12 carbon atoms unsubstituted or substituted by hydroxy, lower alkoxy having one to four carbon atoms in the alkyl part, acyloxy having one to four carbon atoms in the alkyl part, or mono- or di-alkylamino having one to four carbon atoms in the alkyl part, or, when $R_2$ is hydrogen, $R_3$ is cyclohexyl, or $R_2$ and $R_3$ together with the amide nitrogen atom form a five- or six-membered ring or such ring having an additional nitrogen or oxygen heteroatom or such six-membered ring wherein the further heteroatom is para to the amide nitrogen atom, or the hydrogen atom on the additional nitrogen heteroatom is substituted by lower alkyl having one to four carbon atoms, or such lower alkyl substituent further substituted by hydroxy, methoxy or acetoxy, $R_4$ is methyl, chloro methyl, phenyl or hydroxy, methoxy or acetoxy substituted phenyl, and X is oxygen or sulphur, in admixture with a pharmaceutically acceptable non-toxic inert diluent or carrier.

2. A pharmaceutical composition for controlling bacterial infections according to claim 1, wherein the compound is of the formula:

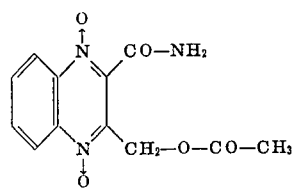

3. A pharmaceutical composition for controlling bacterial, infections according to claim 1, wherein the compound is of the formula:

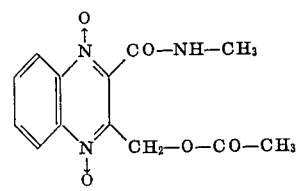

4. A pharmaceutical composition for controlling bacterial infections according to claim 1, wherein the compound is of the formula:

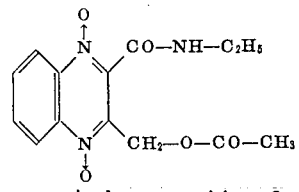

5. A pharmaceutical composition for controlling bacterial infections according to claim 1, wherein the compound is of the formula:

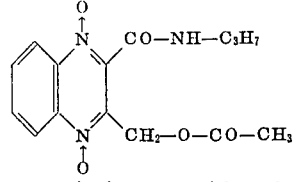

6. A pharmaceutical composition for controlling bacterial infections according to claim 1, wherein the compound is of the formula:

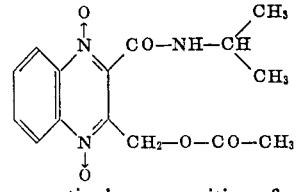

7. A pharmaceutical composition for controlling bacterial infections according to claim 1, wherein the compound is of the formula:

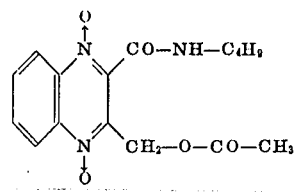

8. A pharmaceutical composition for controlling bacterial infections according to claim 1, wherein the compound is of the formula:

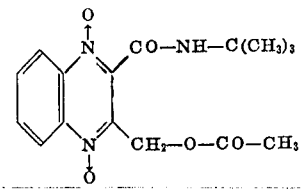

9. A pharmaceutical composition for controlling bacterial infections according to claim 1, wherein the compound is of the formula:

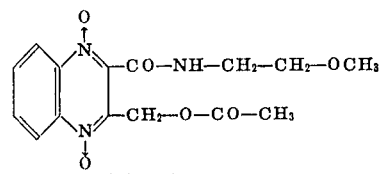

10. A pharmaceutical composition for controlling bacterial infections according to claim 1, wherein the compound is of the formula:

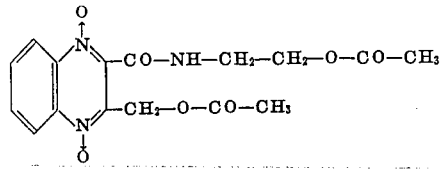

11. A pharmaceutical composition for controlling bacterial infections according to claim 1, wherein the compound is of the formula:

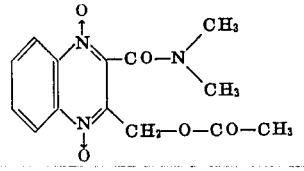

12. A pharmaceutical composition for controlling bacterial infections according to claim 1, wherein the compound is of the formula:

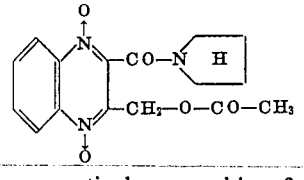

13. A pharmaceutical composition for controlling bacterial infections according to claim 1, wherein the compound is of the formula:

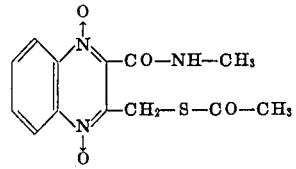

14. A pharmaceutical composition for controlling bacterial infections according to claim 1, wherein the compound is of the formula:

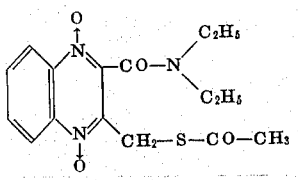

15. A pharmaceutical composition for controlling bacterial infections according to claim 1, wherein the compound is of the formula:

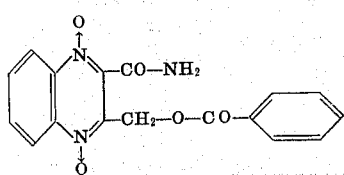

16. A pharmaceutical composition for controlling bacterial infections according to claim 1, wherein the compound is of the formula:

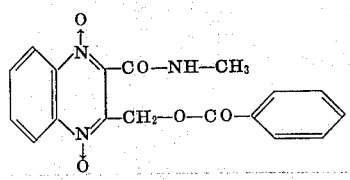

17. A pharmaceutical composition for controlling bacterial infections according to claim 1, wherein the compound is of the formula:

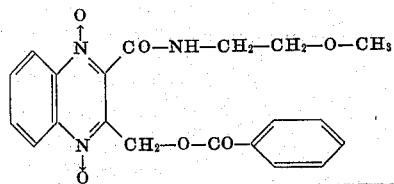

18. A pharmaceutical composition for controlling bacterial infections according to claim 1, wherein the compound is of the formula:

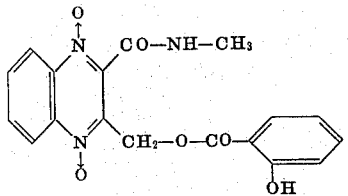

19. A pharmaceutical composition for controlling bacterial infections according to claim 1 in oral administration form.

20. A pharmaceutical composition for controlling bacterial infections according to claim 1 in parenteral administration form.

21. A method of controlling bacterial infections in humans and animals which comprises administering to an infected host an antibacterially effective amount of a compound of the formula:

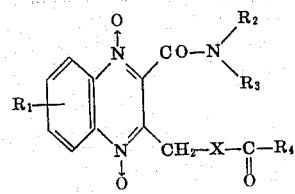

in which
$R_1$ is hydrogen, lower alkyl having one to four carbon atoms, lower alkoxy having one to four carbon atoms in the alkyl part or chlorine, $R_2$ is hydrogen or a straight or branched chain alkyl having one to 12 carbon atoms, unsubstituted or substituted by hydroxy, lower alkoxy having one to four carbon atoms in the alkyl part, acyloxy having one to four carbon atoms in the alkyl part, mono- or di-alkylamino having one to four carbon atoms in the alkyl part, $R_3$ is hydrogen or straight or branched chain alkyl having one to 12 carbon atoms unsubstituted or substituted by hydroxy, lower alkoxy having one to four carbon atoms in the alkyl part, acyloxy having one to four carbon atoms in the alkyl part, or mono- or di-alkylamino having one to four carbon atoms in the alkyl part, or, when $R_2$ is hydrogen, $R_3$ is cyclohexyl, or $R_2$ and $R_3$ together with the amide nitrogen atom form a five- or six-membered ring or such ring having an additional nitrogen or oxygen heteroatom or such six-membered ring wherein the further heteroatom is para to the amide nitrogen atom, or the hydrogen atom on the additional nitrogen heteroatom is substituted by lower alkyl having one to four carbon atoms, or such lower alkyl substituent further substituted by hydroxy, methoxy or acetoxy, $R_4$ is methyl, chloromethyl, phenyl or hydroxy, methoxy or acetoxy substituted phenyl, and X is oxygen or sulphur.

22. A method of treatment according to claim 21 wherein the compound is of the formula:

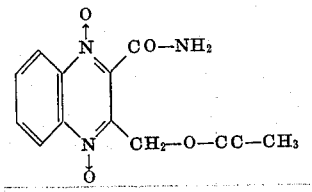

23. A method of treatment according to claim 21 wherein the compound is of the formula:

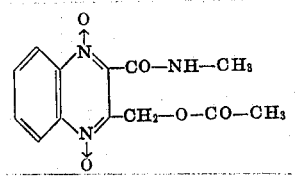

24. A method of treatment according to claim 21 wherein the compound is of the formula:

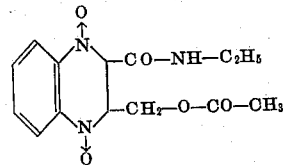

25. A method of treatment according to claim 21 wherein the compound is of the formula:

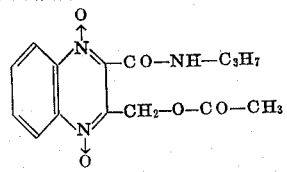

26. A method of treatment according to claim 21 wherein the compound is of the formula:

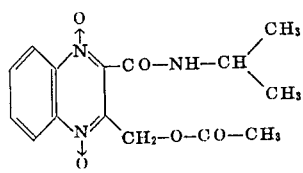

27. A method of treatment according to claim 21 wherein the compound is of the formula:

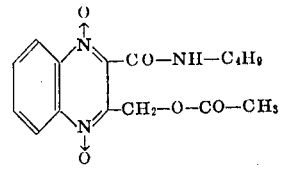

28. A method of treatment according to claim 21 wherein the compound is of the formula:

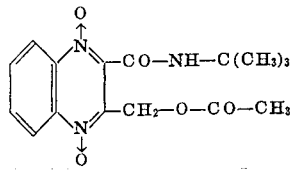

29. A method of treatment according to claim 21 wherein the compound is of the formula:

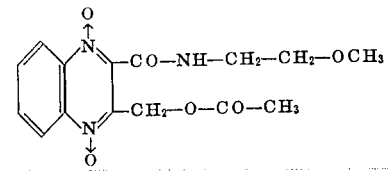

30. A method of treatment according to claim 21 wherein the compound is of the formula:

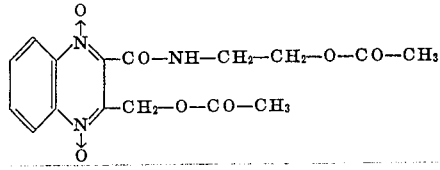

31. A method of treatment according to claim 21 wherein the compound is of the formula:

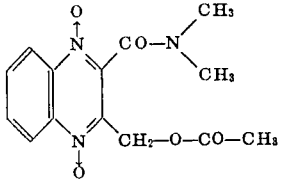

32. A method of treatment according to claim 21 wherein the compound is of the formula:

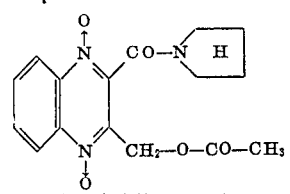

33. A method of treatment according to claim 21 wherein the compound is of the formula:

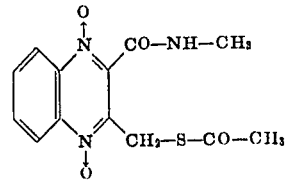

34. A method of treatment according to claim 21 wherein the compound is of the formula:

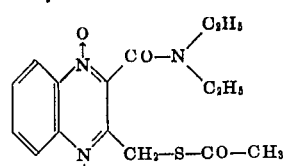

35. A method of treatment according to claim 21 wherein the compound is of the formula:

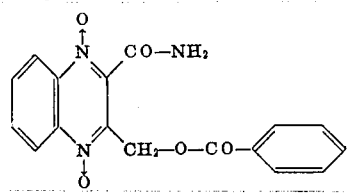

36. A method of treatment according to claim 21 wherein the compound is of the formula:

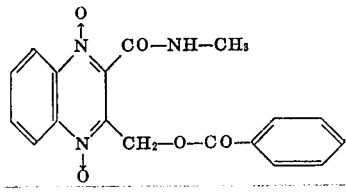

37. A method of treatment according to claim 21 wherein the compound is of the formula:

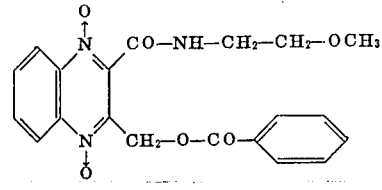

38. A method of treatment according to claim 21 wherein the compound is of the formula:

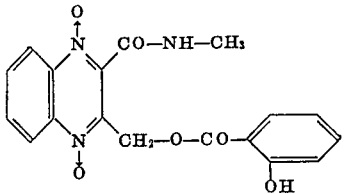

39. A method of treatment according to claim 21 wherein the administration is oral.

40. A method of treatment according to claim 21 wherein the administration is parenteral.

* * * * *

PO-1050
(5/69)

UNITED STATES PATENT OFFICE
CERTIFICATE OF CORRECTION

Patent No. 3,694,555      Dated September 26, 1972

Inventor(s) Kurt Ley et al

It is certified that error appears in the above-identified patent and that said Letters Patent are hereby corrected as shown below:

In the heading of the patent, insert

-- Claims priority from German Application No. F 53666 IVd/15p filed October 4, 1967. --

Signed and sealed this 8th day of May 1973.

(SEAL)
Attest:

EDWARD M. FLETCHER, JR.      ROBERT GOTTSCHALK
Attesting Officer      Commissioner of Patents